(12) United States Patent
Fontana et al.

(10) Patent No.: US 8,040,592 B2
(45) Date of Patent: Oct. 18, 2011

(54) ENCAPSULATED DISPERSIONS COMPRISING ELECTROPHORETICALLY MOBILE ORGANIC COLORANTS

(75) Inventors: Margherita Fontana, Basel (CH); Gerardus De Keyzer, Riehen (CH); Philippe Bugnon, Le Mouret (CH); Marcel Hahn, Magden (CH); Kishor Kumar Mistry, Bradford (GB); Clemens Auschra, Freiburg (DE)

(73) Assignee: BASF SE, Ludwigshafen (DE)

( * ) Notice: Subject to any disclaimer, the term of this patent is extended or adjusted under 35 U.S.C. 154(b) by 240 days.

(21) Appl. No.: 12/308,628

(22) PCT Filed: Jun. 27, 2007

(86) PCT No.: PCT/EP2007/056387
§ 371 (c)(1),
(2), (4) Date: Dec. 19, 2008

(87) PCT Pub. No.: WO2008/003619
PCT Pub. Date: Jan. 10, 2008

(65) Prior Publication Data
US 2010/0265564 A1  Oct. 21, 2010

(30) Foreign Application Priority Data
Jul. 6, 2006  (EP) .................... 06116687

(51) Int. Cl.
*G02B 26/00*  (2006.01)

(52) U.S. Cl. ........................................ 359/296
(58) Field of Classification Search .......... 359/296; 430/32, 34, 38; 345/107, 105; 204/600, 204/400; 106/476; 252/582, 583
See application file for complete search history.

(56) References Cited

U.S. PATENT DOCUMENTS

| | | | |
|---|---|---|---|
| 5,284,816 A * | 2/1994 | Stephenson | 503/227 |
| 5,322,891 A * | 6/1994 | Takahashi et al. | 524/847 |
| 5,964,935 A | 10/1999 | Chen et al. | 106/401 |
| 6,663,802 B2 * | 12/2003 | Sacripante | 264/1.7 |
| 6,822,781 B1 | 11/2004 | Amici et al. | 359/296 |
| 7,688,496 B2 * | 3/2010 | Moriyama et al. | 359/296 |
| 7,741,378 B2 * | 6/2010 | Cui | 521/60 |
| 2004/0218252 A1 | 11/2004 | Motoi et al. | 359/296 |
| 2004/0257330 A1 | 12/2004 | Minami | 345/107 |
| 2009/0009694 A1 | 1/2009 | Ito et al. | 349/96 |

FOREIGN PATENT DOCUMENTS

| | | |
|---|---|---|
| WO | 02/35502 | 5/2002 |
| WO | 2004/067593 | 8/2004 |
| WO | 2004/068234 | 8/2004 |
| WO | 2006/038731 | 4/2006 |

OTHER PUBLICATIONS

Patent Abstracts of Japan—Machine Translation of JP 2003/330179 (Nov. 2003).
Patent Abstracts of Japan—Machine Translation of JP 2004/117934 (Apr. 2004).

\* cited by examiner

*Primary Examiner* — Ricky Mack
*Assistant Examiner* — Tuyen Tra
(74) *Attorney, Agent, or Firm* — Qi Zhuo

(57) ABSTRACT

The invention relates to an electrophoretic display, comprising electrodes and cells containing at least one kind of ionic, monochrome particles, a non-polar liquid and a dispersant, wherein the ionic, monochrome particles of at least one kind are essentially aggregates consisting of a carbon containing pigment and an anionic pigment or anionic pigment derivative, and the dispersant is selected from the group consisting of polyacrylates, polyesters, polyurethanes and copolymers. In general, the whole quantity of the pigment and the main part, preferably at least 80%, most preferred from 95% to 100%, of the whole anionic pigment or anionic pigment derivative present within the cells is comprised in the aggregates, with essentially no pigment and only a minor part of the anionic pigment or anionic pigment derivative physically distinct from the aggregates.

14 Claims, No Drawings

ENCAPSULATED DISPERSIONS COMPRISING ELECTROPHORETICALLY MOBILE ORGANIC COLORANTS

Electrophoretic displays are gaining increased importance, for example as an alternative to liquid crystal displays. However, a fully satisfactory full colour system is not yet available. Thus, it is desirable to improve this promising technology.

JP-A-2003/330 179 discloses photosensitive recording materials suitable for electrophoresis, which comprise organic pigments optionally surface-treated with polymers, titanates or silanes, for example through graft polymerisation.

JP-A-2004/117 934 teaches to use mixtures of pigments having different particle size distributions, one of the pigments being in the range from 0.04 to 0.3 μm. These mixtures are incorporated into chargeable particles used in an electric insulating solvent. In one example, titanium dioxide is ground with Isopar® L (mixture of $C_{10}$-$C_{12}$ isoalkanes [STN registry no 65072-03-9]) and Bontron® P-51 (triethyl-benzyl-ammonium 4-hydroxy-naphtyl-1-sulfonate [STN registry no 100783-78-6]) to produce positively charged particles.

A similar idea is disclosed in US-A-2004/0 218 252 (the terminology used therein does not match the usual meaning of "granules" and "particles"). For example, pigments of average primary particle size from 10 to 50 nm are combined with other pigments of average primary particle size from 100 to 700 nm. However, the polymeric granules wherein these pigments are embedded have a much greater size of 1 to 3 μm, which is difficult to control precisely.

WO 2004/067 593 discloses desorption of dispersing agents adsorbed on the electrophoretic particles to be a display quality problem, resolvable through graft polymerisation of a reactive surfactant to fix amphipathic residual groups onto the surface of the electrophoretic particles, which may contain organic pigments. Examples of reactive surfactants are $CH_2=CH-(CH_2)_9-OSO_3Na$ and $CH_2=C(CH_3)-COO-CH_2CH_2-N^+(CH_3)_2-(CH_2)_{11}CH_3.Br^-$. WO 2004/068 234 discloses non-aqueous electrophoretic capsules comprising a halogenated polymeric shell. A number of possible components are disclosed, including preferably non-ionic and polyfluorinated dyes as well as organic pigments, either as such or encapsulated. However, the colorants are used in the liquid phase and should have a colour contrast to the primary colour particles. There is also no mention nor suggestion of sulfonates or sulfates to be used as a surface treatment.

WO 02/35 502 discloses gyricon displays containing modified, at least bichromal particles of size range from about 0.05 μm to about 100 μm, in which the interaction of the ball or element with the surrounding materials is minimized so that there is no need for suspension aids. In the only detailed embodiment, the particles are polymer coated. However, gyricon displays have an undesirably slow response to the control electric field because the bichromal particles of relatively high mass must rotate and the relatively low specific surface area further leads to a relatively low charge/mass ratio.

WO2006/038 731 discloses a conventional, high contrast colour filter for liquid crystal displays, which is manufactured from photocurable pigments dispersions comprising pigments of size 0.001-0.1 μm.

Hence, the coloristic and/or electrophoretic properties of prior art electrophoretic displays still need improvements to compete successfully with other technologies. Furthermore, the precise control of the particle size distribution of primary pigment particles embedded in a polymeric granule is difficult and affected by dispersibility and aggregation problems, with the additional problem that the electrophoretic properties must remain satisfactory. Especially desirable is a multi-colour electrophoretic display with high colour saturation, which is yet not available.

A new idea has now been developed, which provides electrophoretically highly mobile pigments having a precise electrical charge per unit of weight as well as precise dimensions. This approach provides surprisingly improved results with pigments comprising carbon atoms, such as carbon black and especially synthetic colour organic pigments comprising aromatic or heteroaromatic groups.

Thus, the invention relates to an electrophoretic display, comprising electrodes and cells containing at least one kind of ionic, monochrome particles, a non-polar liquid and a dispersant, wherein the ionic, monochrome particles of at least one kind are essentially aggregates consisting of a carbon containing pigment and an anionic pigment or anionic pigment derivative, and the dispersant is selected from the group consisting of polyacrylates, polyesters, polyurethanes and copolymers.

Generally, the cells comprise monochrome particles of 1, 2, 3, 4 or 5 kinds, but it is not necessary that all kinds of monochrome particles are essentially aggregates consisting of a carbon containing pigment and an anionic pigment or anionic pigment derivative. On the contrary, ionic, monochrome particles of different kinds may comprise pigment derivatives of different polarities. The monochrome particles of different kinds preferably have different colours.

The monochrome particles which are essentially aggregates consisting of a carbon containing pigment and an anionic pigment or anionic pigment derivative can comprise further components, such as impurities or additives, as long as these do not affect the aggregation of the pigment and anionic pigment or anionic pigment derivative.

When the dispersant is a copolymer, it can have any known polymer architecture such as a block, gradient, graft and/or random copolymer. Preferred are block copolymers or graft copolymers, most preferred block copolymers, especially block copolymers obtained by transesterification as disclosed in WO06/074 969. Preferably, the dispersant is a polyacrylate or a copolymer build from at least two ingredients selected from the group consisting of acrylate, ester and urethane ingredients, most preferably at least one acrylate.

Suitably, the dispersant comprises polar as well as apolar or low polar ingredients. Preferably, the polar ingredients are selected from the group consisting of ingredients comprising a nitrogen atom and ingredients comprising an aromatic ring, and the apolar or low polar ingredients are selected from the group consisting of acrylic acid esters, methacrylic acid esters, allyl esters and vinyl esters, the ester group of which comprises from 1 to 24 carbon atoms and optionally from 1 to 12 oxygen and/or silicon atoms, allyl and vinyl $C_1$-$C_{24}$alkyl ethers, styrene, $C_1$-$C_{24}$alkyl-substituted styrenes, $C_4$-$C_{12}$lactones and hydroxy-$C_2$-$C_{24}$acids.

Examples of suitable ingredients comprising a nitrogen atom or an aromatic ring are in particular primary, secondary and tertiary mono-, oligo- or polyamines, primary and secondary amides, saturated, unsaturated and aromatic N-heterocycles, and phenyl and naphthyl groups, such as amino-functional (meth)acrylates like dimethylaminoethyl acrylate, dimethylaminoethyl methacrylate, dimethylaminopropyl methacrylamide, tert.-butylaminoethylmethacrylate, 2-, 3- or 4-vinylpyridine, 4-dimethylaminostyrene, N-vinylimidazole or salts thereof with organic or inorganic acids; N-vinyl-2-pyrrolidone; benzyl(meth)acrylate; dimethyl-acrylamide; 2-(2-oxo-1-imidazolidinyl)ethyl methacrylate; adducts of aminic or aromatic compounds with glycidylmethacrylate; polyethylene imine; polyallylamine; polyvinylamine; N-dimethylaminoethanol; N-diethylaminoethanol; ethylene diamine; 3-N-dimethylaminopropylamine; diethylenetriamine; triethylenetetramine; tetra-ethylenepentamine; 3-aminopropyl-imidazole and N-(2-hydroxyethyl)morpholine.

As is apparent from above list, the ingredients comprising a nitrogen atom or an aromatic ring can optionally additionally comprise further functionality, such as additional nitrogen and/or oxygen atoms. Especially preferred polar ingredients are polyethyleneimine, N-diethylaminoethanol, 3-aminopropylimidazol and substituted or unsubstituted vinylpyridin. It is also suitable to use the ingredients comprising a nitrogen atom in combination with elements lacking a nitrogen atom, such as in combination with styrene, thus leading to copolymeric polar building blocks.

Examples of suitable (meth)acrylates (that is, acrylates or methacrylates) are for example (meth)acrylates of $C_1$-$C_{24}$ saturated or $C_3$-$C_{24}$ unsaturated, linear or branched, aliphatic or unsaturated alcohols; of $C_7$-$C_{24}$ aralkyl alcohols, such as methyl(meth)acrylate, butyl(meth)acrylate, isobutyl(meth)acrylate, tert.-butyl(meth)-acrylate, 2-ethylhexyl(meth)acrylate, isodecyl(meth)acrylate, stearyl(meth)acrylate, oleyl (meth)acrylate and phenethyl(meth)acrylate; (meth)acrylates of alcohols which contain one or more ether linkages, such as (meth)acrylates of 2-phenoxyethanol or ethylene oxide or propylene oxide adducts, like butyl glycol, butyl diglycol, ethyltriglycol or methoxy- or ethoxypolyethyleneglycols of molecular weights from 300 to 3000; (meth)acrylates of polyols which optionally contain one or more ether linkages, such as or (meth)acrylates of glycols, for example 2-hydroxyethanol or 2-hydroxypropanol, or of oligosilicone alcohols, for example OH-endfunctional polydimethylsilicone of molecular weight from 300 to 5000.

Preferred (meth)acrylates are obtained from mixtures containing monomers selected from butyl acrylate and (meth)acrylates of at least partly branched long chain aliphatic $C_{10}$-$C_{18}$ alcohols, in particular from mixtures containing butylacrylate and at least partly branched $C_{12}$-$C_{15}$ alcohols. Most preferred (meth)acrylates are such, which are obtained by controlled free radical polymerisation, in particular as disclosed in WO 06/074 969.

Examples of suitable $C_1$-$C_{24}$alkyl-substituted styrenes, $C_4$-$C_{12}$lactones and hydroxy-$C_2$-$C_{24}$acids are vinyltoluene or tert.-butylstyrene, ∈-caprolactone or δ-valerolactone, and 12-hydroxystearic acid, respectively, preferably 12-hydroxystearic acid.

The apolar or low polar ingredients, for example alkyl, alkoxy or alkylester groups, provide affinity to the non-polar liquid. The polar ingredients comprising a nitrogen atom or an aromatic ring, for example an amino group, a N-heterocyclic group or a phenyl ring, provide affinity to the pigment.

The dispersant has preferably a low number of ionic groups, so that the total number of ionic groups of the dispersant is equal to or lower than the total number of ionic groups of the anionic pigment or anionic pigment derivative. The ratio of ionic groups of the anionic pigment or anionic pigment derivative to ionic groups of the dispersant is preferably at least 1:1, especially at least 5:1. Most preferably, the dispersant is non-ionic.

The dispersant is preferably a block copolymer comprising a chain consisting essentially of a poly(acrylic acid esters and/or methacrylic acid esters) and a chain build with ingredients comprising a nitrogen atom. More preferred, the dispersant is a linear block copolymer consisting essentially of a chain consisting essentially of a poly(acrylic acid esters and/ or methacrylic acid esters), a chain build with ingredients comprising a nitrogen atom and two terminal groups. The chain build with ingredients comprising a nitrogen atom is preferably polyethylene imine and/or poly(vinylpyridin), most preferred polyvinylpyridin. The dispersant has preferably a number average molecular weight $M_n$ of about 2000 to 20000, preferably from 3000 to 10000, with from 20 to 150, preferably from 40 to 120 ester groups in the poly(acrylic acid esters and/or methacrylic acid esters) and from 5 to 40, preferably from 10 to 20 aromatic groups in the polyethylene imine and/or poly(vinylpyridin).

Examples of suitable dispersants are such described in EP 0 876 413, EP 1 071 681, WO 00/40 630, EP 1 275 689, WO 03/046 029 or WO 06/074 969, in particular Disperbyk® 2000, Disperbyk® 2001, EFKA® 4300, EFKA® 4340, Solsperse® 17000, Solsperse® 18000 and Noveon™, which are of particular interest in combination with tetra-chloro-ethylene as non-polar liquid. The dispersants according to WO 06/074 969 are especially preferred also in combination with special solvents of particular relevance for electronic paper, such as aliphatic hydrocarbons, silicone fluids, Isopar™ G, Isopar™ M and Halocarbon™ 0.8, as their solubility and compatibility can be easily adjusted.

The pigment can be inorganic or preferably organic, for example carbon black or pigments of the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or lakes, in particular unsubstituted or partially halogenated phthalocyanines such as copper, zinc or nickel phthalocyanines, 1,4-diketo-3,6-diaryl-pyrrolo[3,4-c]pyrroles, dioxazines, isoindolinones, indanthrones, perylenes and quinacridones. Azo pigments can be, for example, mono- or dis-azo pigments from any known sub-class, obtainable, for example, by coupling, condensation or lake formation.

Notably useful are the pigments described in the Colour Index, including Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37 and 50; Pigment Black 7, 12, 27, 30, 31, 32 and 37; Vat Red 74; 3,6-di(3',4'-dichloro-phenyl)-2,5-dihydro-pyrrolo[3,4-c]pyrrole-1,4-dione, 3,6-di(4'-cyano-phenyl)-2,5-dihydro-pyrrolo[3,4-c]-pyrrole-1,4-dione and 3-phenyl-6-(4'-tert-butyl-phenyl)-2,5-dihydro-pyrrolo-[3,4-c]pyrrole-1,4-dione; and mixtures and solid solutions thereof.

The anionic pigment or anionic pigment derivative is generally a derivative of one of the above-mentioned organic pigments, preferably a sulfonate, sulfate, carboxylate, carbonate, phosphonate or phosphate, most preferred a sulfonate or sulfate. These groups can be attached through a non-conjugated linking group, for example an alkylene, ether and/or thio chain, but are preferably directly bound to an aromatic group of the chromophore. The anionic pigment or anionic pigment derivative can alternatively be the deprotonated form of a pigment. Adequately, the amount of anionic pigment or anionic pigment derivative is from 0.1 to 15% by weight, preferably from 1 to 12% by weight, most preferred from 5 to 10% by weight, calculated as protonated acid form based on the pigment. When there is more than one kind of monochrome particles, this is preferably true for all kinds of monochrome particles.

The anionic pigment or anionic pigment derivative is generally present as an alkali or ammonium salt, preferably as a quaternary ammonium salt, whereby the alkali or ammonium ions suitably dissociate in an electric field or a polar liquid medium. Preferably, at least 50%, most preferred from 80% to 100%, of the green, alkali or ammonium ions dissociate in an electric field or a polar liquid medium. Less dissociation leads to a decrease of the display's efficiency.

Quaternary ammonium cations are for example of the formula

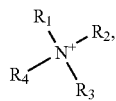

wherein $R_1$ and $R_2$ are independently from one another $C_1$-$C_{24}$alkyl, $C_2$-$C_{24}$alkenyl or $C_{12}$-$C_{24}$cycloalkenyl, $R_3$ and $R_4$ are independently from one another $C_1$-$C_{12}$alkyl, $C_3$-$C_{12}$cycloalkyl, $C_3$-$C_{12}$cycloalkenyl, $C_6$-$C_{12}$aryl, $C_7$-$C_{12}$aralkyl or [$C_2$-$C_4$alkylene-O]$_n$$R_5$, $R_5$ is H or $C_1$-$C_{12}$alkyl, and n is a number from 1 to 12.

Preferably, $R_1$ is $C_{12}$-$C_{24}$alkyl, $R_2$ is $C_1$-$C_{20}$alkyl, $R_3$ is $C_1$-$C_4$alkyl, phenyl, benzyl or [$C_2$-$C_4$alkylene-O]$_n$H, and $R_4$ is $C_1$-$C_4$alkyl, phenyl, benzyl or [$C_2$-$C_4$alkylene-O]$_n$H.

$C_1$-$C_{24}$Alkyl or $C_3$-$C_{24}$cycloalkyl can be straight-chain or branched, or monocyclic or polycyclic. Alkyl is, for example, methyl, straight-chain $C_2$-$C_{24}$alkyl or preferably branched $C_3$-$C_{24}$alkyl. $C_1$-$C_{24}$Alkyl is therefore, for example, methyl, ethyl, n-propyl, isopropyl, n-butyl, sec-butyl, isobutyl, tert-butyl, n-pentyl, 2-pentyl, 3-pentyl, 2,2-dimethylpropyl, n-hexyl, n-octyl, 1,1,3,3-tetramethylbutyl, 2-ethylhexyl, nonyl, decyl, dodecyl, tetradecyl, hexadecyl, octadecyl, eicosyl, heneicosyl, docosyl or tetracosyl. $C_3$-$C_{24}$Cycloalkyl is, for example, cyclopropyl, cyclobutyl, cyclopentyl, cyclohexyl, trimethylcyclohexyl, menthyl, thujyl, bornyl, 1-adamantyl, 2-adamantyl or a steroid radical.

$C_2$-$C_{24}$Alkenyl or $C_3$-$C_{24}$cycloalkenyl is $C_2$-$C_{20}$alkyl or $C_3$-$C_{24}$cycloalkyl that is mono- or poly-unsaturated, wherein two or more double bonds can be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

$C_7$-$C_{12}$Aralkyl is, for example, benzyl, 2-benzyl-2-propyl, β-phenyl-ethyl, 9-fluorenyl, α,α-dimethylbenzyl, ω-phenyl-butyl or ω-phenyl-hexyl.

$C_6$-$C_{12}$Aryl is, for example, phenyl, naphthyl, biphenylyl or 2-fluorenyl.

In general, the whole quantity of the pigment and the main part, preferably at least 80%, most preferred from 95% to 100%, of the whole anionic pigment or anionic pigment derivative present within the cells is comprised in the aggregates, with essentially no pigment and only a minor part of the anionic pigment or anionic pigment derivative physically distinct from the aggregates. Free pigment leads to haze, a higher amount of free anionic pigment or anionic pigment derivative leads to the apparition of turbulences and to instability of the display.

An adequate method to prepare the aggregates is the co-dispersion of the pigment and the anionic pigment or anionic pigment derivative in an inert polar liquid, for example through wet-milling or high-speed mixing, at a temperature of from −20 to 200° C., preferably from −20 to 200° C., most preferred from 0 to 50° C., and isolation of the aggregates from the polar liquid. Adequate polar liquids have a dielectric constant $\in$ of from 10 to 100, preferably from 30 to 80 (at 25° C.). Most suitable are hydrophilic polar liquids, such as water, mono- or polyalcohols, ketones, amides, sulfoxides and sulfones, preferably water.

At 25° C., the non-polar liquid in the cells has suitably a dielectric constant $\in$ of from 0 to 20, preferably from 0 to 5, preferably from 0 to 3.2, a conductivity κ of from 0 to 0.1 $S \cdot m^{-1}$, preferably from 0 to $10^{-2}$ $S \cdot m^{-1}$, especially from $10^{-16}$ to $10^{-8}$ $S \cdot m^{-1}$ and a transparency of from 90 to 100%, preferably from 95 to 100%, measured in a 1 cm thick quartz cell, at one wavelength in the range of from 400 to 700 nm. The same conductivity ranges are also valid for the whole content of the cells (dispersion). The non-polar liquid especially also has a dipole moment μ of from 0 to $10^{-18}$ esu, preferably from 0 to $3 \cdot 10^{-19}$ esu.

Examples of non-polar liquids include aromatic hydrocarbons, such as toluene, xylenes, or alkylbenzenes; aliphatic hydrocarbons such as pentane, hexane, octane, decane or dodecane; alicyclic hydrocarbons such as cyclohexane or methyl cyclohexane; halogenated hydrocarbons such as methylene chloride, chloroform, carbon tetrachloride, tetrachloroethylene or 1,2-dichloroethane; silicones; mineral oil such as silicon oil or fluorocarbon oil; vegetable oil such as olive oil and long-chain fatty acid esters. These non-polar liquids can be used alone or as mixtures. Examples of commercial mixtures are Isopar™ G, Isopar™ M and Halocarbon™ 0.8.

The liquid dispersion media can comprise the functionalized particles according to the present invention in an amount of 0.01 to 25% by weight, especially 0.1 to 10% by weight.

The instant monochrome particles are especially useful for the preparation of any type of electrophoretic displays ("electronic paper"), comprising for example one or two types of electrophoretically mobile particles, if applicable preferably of different, contrasting colours. The electrophoretic mobility and the dispersion stability of the instant monochrome particles are surprisingly high.

The monochrome particles are generally dispersed in the non-polar liquid with the help of the dispersant. The monochrome particles can be transparent or opaque, and black, white, or preferably coloured, for example red, blue, green, yellow, magenta or cyan. The instant cells can also comprise two or more kinds of monochrome particles, which can be of same or different colours, for example each two or more kinds of black, white, red, blue, green, yellow, magenta or cyan, or black or white together with red, blue, green, yellow, magenta or cyan monochrome particles. However, each particle is adequately homogeneously coloured—that is, shows the same colour independently from the direction of view.

Similarly, the electrophoretic display can comprise cells of identical or different composition, for example from one to eight types of cells each comprising monochrome particles of a single black, white, red, blue, green, yellow, magenta or cyan colour, or from one to six types of cells each comprising monochrome particles of black or white as well as of red, blue, green, yellow, magenta or cyan colour. Preferably, the electrophoretic display comprises cells all of identical composition or cells of from one to six colours black, white, red, blue, green, yellow, magenta or cyan, especially of three or four colours, such as red, blue, green and optionally black or white, or yellow, magenta and cyan. When the electrophoretic display comprises monochrome particles of different colours, it is generally suitable only the monochrome particles of one colour or those of colours of no more than 120° different hue angle according to the C.I.E. 1976 L*C*h color space to have the instant structure, while the monochrome particles of other colours, especially black or white cells, should have the reverse polarity.

The cells can be made in analogy to known methods. Preferred is a process for manufacturing cells comprising a skin, a non-polar liquid, a dispersant and at least one kind of ionic, monochrome particles dispersed into the non-polar liquid, wherein the ionic, monochrome particles of at least one kind are essentially aggregates consisting of a carbon containing pigment and an anionic pigment or anionic pigment derivative and the dispersant is selected from the group consisting of polyacrylates, polyesters, polyurethanes and copolymers, which process comprises the steps of (1) dispersing the ionic, monochrome particles of at least one kind into the non-polar liquid to form a suspension, (2) dispersing the suspension into a second liquid which is immiscible with the non-polar liquid to form droplets, and (3) generating the skin around the droplets through coacervation, emulsion polymeri-sation and/or emulsion polycondensation of one or more precursors preferably dissolved or dispersed into the second liquid. Coacervation is well-known in the art and described for example in U.S. Pat. Nos. 5,432,445, 5,460,817, US-2005/0 156 340 and US-2006/0 007 528. In-situ polymerisation methods are for example disclosed in WO-01/54 809 and WO-05/105 291. Precursors suitable for coacervation or to form polymeric layers and methods of forming polymeric layers are also well-known in the art. The second liquid is preferably aqueous.

Full colour transmissive displays (substractive, with back light or a white reflector) preferably comprise the colours yellow, magenta and cyan arranged in layers ontop of each other. On the other hand, full colour reflective displays (additive) preferably comprise the colours red, blue and green arranged side by side.

The cells contain suitably multiple particles, the number thereof depending on the particular embodiment. Each embodiment can be realized with cells constituted of compartments or of capsules. The only difference is that compartments are build directly on the electrophoretic display, while capsules are made separetely, then coated onto the electrophoretic display. In each cell, the instant monochrome particles can be used alone, in combination together or in combination with any other electrophoretically mobile particles, preferably in combination with cationic black or white particles. There are two main embodiments, though the invention can of course also be performed in further, different ways.

In the first embodiment, the instant monochrome particles are transparent, with a weight average particle size of from 10 to 100 nm, preferably from 20 to 80 nm. The number of particles per cell is generally from $10^2$ to $10^{15}$, preferably from $10^4$ to $10^{12}$. In this case, one electrode is arranged towards or on the side of the cell (pixel), while the other electrode is arranged parallel to the display's surface, both in a cut view perpendicular to the electrophoretic display. Such a construction is shown for example on FIG. 5B of US-A-2004/0 218 252. The non-polar liquid is preferably substantially colourless, with a transparency of from 90 to 100%, preferably from 95 to 100%, measured in a 1 cm thick quartz cell, in the whole range of from 400 to 700 nm. This embodiment can be used either as a reflective display above white reflective ground, or as a transmissive display with back light.

When a positive potential is applied to the electrode arranged towards or on the side of a pixel, the instant monochrome particles move to the side of the pixels and almost the whole, generally white light is transmitted through the pixel. When a negative potential is applied to the electrode arranged towards or on the side of a pixel is switched as the anode, the instant monochrome particles move to the other, positively charged electrode and cover most of the pixel's surface, so that part of the visible light spectrum is absorbed by the monochrome particles and almost only the complementary colour is transmitted through the pixel.

In the second embodiment, the instant monochrome particles are opaque, with a weight average particle size of from 100 to 500 nm, preferably from 200 to 400 nm. The number of particles per cell is generally from $10^2$ to $10^8$, preferably from $10^3$ to $10^6$. In this case, both electrodes are arranged parallel to the display's surface, on opposite sides of the pixels, in a cut view perpendicular to the electrophoretic display. Such a construction is shown for example on for example on drawing 8 of JP-A-2003/330 179 (capsule), or on FIG. 8 of WO 2004/067 593 (compartment). When other monochrome particles of colour black, white or having a more than 120° different hue angle according to the C.I.E. 1976 L*C*h color space are also present, the non-polar liquid can be either coloured or colourless, but is preferably substantially colourless, with a transparency of from 90 to 100%, preferably from 95 to 100%, measured in a 1 cm thick quartz cell, in the whole range of from 400 to 700 nm. When no such additional monochrome particles are present, the non-polar liquid is on the contrary preferably coloured, with a transparency of from 0 to 20%, preferably from 0 to 10%, measured in a 1 cm thick quartz cell, at one wavelength in the range of from 400 to 700 nm.

When a positive potential is applied to the electrode arranged on the top of the pixel, the instant monochrome particles move to the top of the pixels and coloured light is reflected by the pixel. When a negative potential is applied to the electrode arranged on the top of the pixel, the instant monochrome particles move to the bottom, so that either light is reflected by the differently coloured particles of different polarity moving to the top of the pixels or by less mobile, reflective particles suspended in the medium, for example white or black particles, or the light reflected by the instant monochrome particles is absorbed by the colour of the non-polar liquid, leading to a colour change. For example, orange-red monochrome particles and a blue-green non-polar liquid would lead to an attractive switch from bright orange-red to dark brown. If the blue-green non-polar liquid would be replaced by less mobile, reflective green particles, it would be possible to switch the electrophoretic display from red to green.

Less mobile particles may be for example such as known previously, or just particles difficult to ionize, such as well dispersed pigments. However, as the charge of the instant particles can advantageously be controlled precisely, it is also possible to obtain less mobile particles by reducing the amount of anionic pigment or anionic pigment derivative in the aggregates. A combination of instant particles of different mobility could then for example be red, opaque monochrome particles comprising a red diketopyrrolopyrrole pigment and a relatively high amount of a diketopyrrolopyrrole derivative, and green, opaque monochrome particles comprising a green phthalocyanine pigment and a relatively low amount of a phthalocyanine derivative. Upon applying an electrical potential between the electrodes, the red particles move faster and reach the target electrode before the green particles.

The instant monochrome particles can if desired be embedded in a polymer. A suitable method therefor is for example to separate electrochemically the ions from the free acid dissolved in a polar solvent, using a proton-permeable membrane between the electrodes, and then radically to polymerize a thin protective and insulating layer of polymer on the anionic pigment particles. The desired ammonium cations are finally added in the form of their hydroxides before the electrical field is removed.

The manufacture of compartments or capsules is well-known in the art. The capsules can be arranged on a support as homogeneous layer or pattern-wise by methods which are well-known in the art for the deposition of solid particles, for example methods used for toners in colour proofing, such as the Chromalin™ process described in DE 35 40 796 and EP 0 051 830. The process can be repeated if desired for multiple colour layers. The electrodes are made as needed by also well-known conventional methods. Capsules can alternatively for example be laminated onto a substrate.

Needless to say, the instant electrophoretic display can be flexible if a flexible substrate is used.

The examples which follow illustrate the invention, without limiting it ("%" are by weight where not otherwise specified):

EXAMPLE 1

39.1 g of a 41.1% aqueous press cake of salt-kneaded C. I. Pigment Red 254 and 0.28 g of a 28.6% aqueous filter cake of the sodium salt of the sulfonated C. I. Pigment Red 254 derivative obtained in example 1a+b of the DE 40 37 556 A1 are dispersed during 90 minutes in 150 ml of water with a Cowles dissolver. 0.16 g of a 50% by weight solution of cocobenzyldimethylammonium chloride in aqueous isopropanol (ARQUAD® MCB-50 [68424-85-1], AKZO) is added to the slurry. After 30 minutes further agitation, the suspension is filtered, washed with water and the product is dried at 80° C./10³ Pa.

EXAMPLE 2

It is proceeded as in example 1, with the difference that 0.56 g instead of 0.28 g of 28.6% aqueous sulfonated C. I. Pigment Red 254, and 0.32 g instead of 0.16 g ARQUAD® MCB-50 are used.

EXAMPLE 3

It is proceeded as in example 1, with the difference that the sulfonated C. I. Pigment Red 254 is replaced by the same quantity (calculated on dry weight) of the diketopyrrolopyrrole carboxylate according to example 11 of U.S. Pat. No. 4,914,211.

EXAMPLE 4

It is proceeded as in example 1, with the difference that the sulfonated C. I. Pigment Red 254 is replaced by the same quantity (calculated on dry weight) of the diketopyrrolopyrrole phosphonate according to example 16 of U.S. Pat. No. 4,914,211.

EXAMPLE 5

It is proceeded as in example 1, with the difference that the sulfonated C. I. Pigment Red 254 is replaced by the same quantity (calculated on dry weight) of the diketopyrrolopyrrole monosulfonate according to example 18 of U.S. Pat. No. 4,791,204.

EXAMPLE 6

23.1 g of a 49.2% aqueous filter cake of salt-kneaded C. I. Pigment Blue 15:3 and 0.42 g of copper phthalocyanine sodium mono-sulfonate (as 26.4% aqueous filter cake) are dispersed together for 90 minutes in 100 ml of water with a Cowles dissolver. Then, 0.2 g ARQUAD® MCB-50 is added. After further agitation during 30 minutes, the suspension is filtered, washed with water and the product is dried at 80° C./10³ Pa.

EXAMPLE 7

23.4 g of a 49.2% aqueous filter cake of salt-kneaded C. I. Pigment Blue 15:3 and 0.23 g of a 1:2 mixture of diheptadecyldimethylammonium copper phthalocyanine mono- and disulfonates (SOLSPERSE® 5000, Lubrizol) are dispersed together for 90 minutes in 100 ml of water with a Cowles dissolver. Then the suspension is filtered, washed with water and the product is dried at 80° C./10³ Pa.

EXAMPLE 8

13.5 g of a 38.9% aqueous filter cake of salt-kneaded C. I. Pigment Green 7 and 0.11 g of the compound of below idealized formula (I) are dispersed for 90 minutes in 100 ml of water with a Cowles dissolver. Then 0.22 g ARQUAD® MCB-50 is added. After 30 minutes further agitation, the suspension is filtered, washed with water and the product is dried at 80° C./10³ Pa.

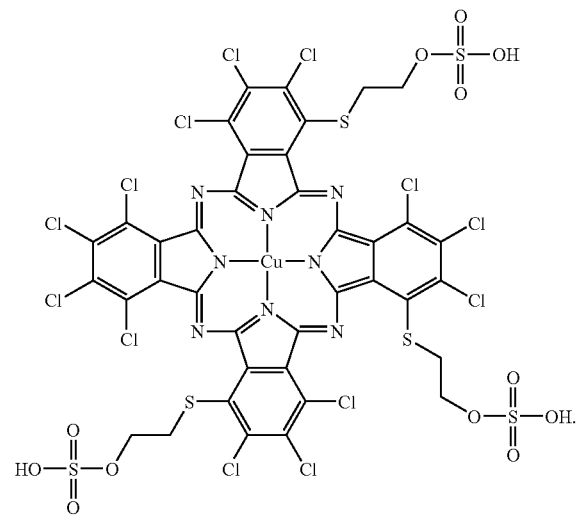

(I)

EXAMPLE 9

14 g of a 35.5% aqueous filter cake of salt-kneaded C. I. Pigment Green 36 and 0.12 g of the compound of formula (I) according to example 8 are dispersed for 90 minutes in 100 ml of water with a Cowles dissolver. Then 0.22 g ARQUAD® MCB-50 is added. After 30 minutes further agitation, the suspension is filtered, washed with water and the product is dried at 80° C./10³ Pa.

EXAMPLE 10

10 g of micronized C. I. Pigment Black 7 are dispersed for 18 hours in 100 ml of water. 0.7 g of sulfanilic acid in 2.9 g water and 1.38 g of 35% hydrochloric acid are treated separately with 1.08 ml of 4M aqueous NaNO₂ solution at 4° C. The diazonium salt is slowly added to the pigment suspension. The suspension is then stirred from 4° C. to 23° C. and then to 40° C. over 2 hours. Then 0.4 g ARQUAD®MCB-50 is added. After 30 minutes further agitation, the suspension is filtered, carefully washed with water and the product is dried at 80° C./10³ Pa.

EXAMPLE 11

20 g of C. I. Pigment Red 122 (Cromophtal® Jet Magenta) and 0.40 g of a 28.6% aqueous filter cake of the sodium salt of monosulfonated Pigment Red 122 are dispersed during 90 minutes in 150 ml of water with a Cowles dissolver. 0.20 g of a 50% by weight solution of cocobenzyldimethylammonium chloride in aqueous isopropanol (ARQUAD® MCB-50 [68424-85-1], AKZO) is added to the slurry. After 30 minutes further agitation, the suspension is filtered, washed with water and the product is dried at 80° C./10³ Pa.

EXAMPLE 12

It is proceeded as in example 11, with the difference that 0.80 g instead of 0.20 g of 28.6% aqueous monosulfonated Pigment Red 122 and 0.32 g instead of 0.16 g ARQUAD® MCB-50 are used.

EXAMPLE 13

5 g of C. I. Pigment Yellow 128 (Cromophtal® Jet Yellow) are dispersed in 100 ml of methanol (d=0.791 g/ml at 25° C., Fluka, Switzerland) and left under agitation for 10 min. At the same time, 260 mg benzyldimethylstearyl-ammonium chloride hydrate (ABCR™, GmbH & Co. KG, Germany) are dissolved in 50 ml of methanol (d=0.791 g/ml at 25° C., Fluka, Switzerland). The solution of the benzyldimethylstearylammonium chloride hydrate is added to the Pigment Yellow 128 slurry, leading to deprotonation of the pigment. The mixture is left under further agitation for 4 hours, than the final suspension is filtered and the product is dried at 40° C./10³ Pa. The concentration of the benzyldimethylstearylammonium chloride hydrate in methanol can adequately be varied from 0.1 to 5% by weight of the pigment concentration.

EXAMPLE 14

20 g of C. I. Pigment Blue 15:3 (Cromophtal® Jet Cyan GLX) and 0.40 g of a sulfonated phthalocyanine derivative (Solsperse 5000®, Noveon™) are dispersed during 90 minutes in 150 ml of water with a Cowles dissolver. After 30 minutes further agitation, the suspension is filtered, washed with water and the product is dried at 80° C./10³ Pa.

EXAMPLE 15

It is proceeded as in example 14, with the difference that 0.80 g instead of 0.40 g of sulfonated phthalocyanine (Solsperse® 5000) are used.

EXAMPLE 16a

In a 5-liter glass reactor with stirrer, cooler, thermometer and monomer feed lines, 1304 g of n-butylacrylate and 72 g of the polymerization regulator of formula

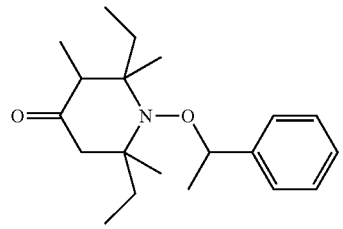

(II) are mixed and degassed thoroughly by N₂/vacuum cycles. The mixture is heated to 115° C. within 1 hour, then kept for further 1 h at the same temperature. Within next 3.5 hours, 2800 g of n-butylacrylate are continuously fed to the reactor while the temperature raises to 128° C., at which temperature the mixture is kept for another 6 hours. 2011 g of a clear, viscous polymer are isolated by stripping off the non-reacted monomer under reduced pressure. GPC-analysis: $M_n$=8800 g/mol, PD=1.20. According to ¹H-NMR, the degree of polymerization is 76.

EXAMPLE 16b

In the same reactor as in example 16a, 2000 g poly(n-BA) of the product according to example 16a and 505 g 4-vinylpyridine are mixed, degassed with N₂/vacuum cycles and polymerized at 125° C. for 5 hours. 2224 g of clear orange polymer are isolated by distilling off the residual monomers under reduced pressure. Due to its high viscosity, the diblock copolymer is diluted for further processing with 1483 g of propyleneglycol-monomethylether-acetate (MPA). GPC-analysis: $M_n$=8834 g/mol, PD=1.27. According to ¹H-NMR, the degree of polymerization of the 4-vinylpyridine block is 14.

EXAMPLE 16c 83.3 g of the MPA-solution of the diblock copolymer according to example 16b and 55.3 g of a branched iso-$C_{12}$-$C_{15}$-alcohol mixture (Neodol® 25 E, Shell) are loaded in a 250 ml flask equipped with a magnetic stirring bar and a distillation column. After heating the mixture to 125° C., the MPA is distilled under reduced pressure before adding 0.28 g of a catalyst solution consisting of 75% by weight bis-acetylacetonato-titanium-bis-isopropylate in isopropanol. The transesterification is started by slowly distilling off n-butanol under reduced pressure and increasing the temperature to 145° C. Two additional portions each of 0.28 g catalyst solution are then added, the first after 1 hour and the second 2 hours later. After 4 hours total reaction time, the transesterification is terminated after no further n-butanol formation is observed. 78 g of a liquid block copolymer are obtained. Analysis via GPC ($M_n$=12465, PDI=1.33) as well as $^1$H-NMR indicates almost quantitative conversion of the branched iso-$C_{12}$-$C_{15}$-alcohol, with a ratio of n-butyl ester to iso-$C_{12}$-$C_{15}$ ester to pyridine groups of 16:60:14.

This liquid block copolymer dispersant can be replaced by similar ones obtainable according to WO06/074969 or commercially available from EFKA.

Examples 17-31 illustrate the preparation of oil phases containing dispersed electrophoretic red, blue, green and black pigment particles.

EXAMPLE 17

10 g of C. I. Pigment Yellow 128 (Cromophtal® Jet Yellow) are dispersed into 10 ml of dodecane (d=0.75 g/ml at 25° C., Fluka, Switzerland) in the presence of 5 g of a liquid block copolymer dispersant according to example 16c. At the same time, 100 mg of quinuclidine (Fluka, Switzerland) are dissolved in 5 ml of dodecane (d=0.75 g/ml at 25° C., Fluka, Switzerland) and than added to the pigment slurry, leading to deprotonation of the pigment. The mixture is left under further agitation in the presence of 5 g of zirconium oxide beads, in a Skandex®SO-100 mixing machine for 15 hours. The concentrations of the quinuclidine can adequately be varied from 0.1 to 5% by weight of the pigment concentration.

EXAMPLE 18

A red electrophoretic dispersion is prepared by ultrasonically dispersing for 1½ h in a Bandelin® Sonorex® Super RH 102 H™ sonicator, at 25° C., 0.23 g of red charged particles according to example 1 into 10 ml of tetrachloro-ethylene (Riedel de Häen, d=1.622 g/cm$^3$) in the presence of 0.048 g of EFKA® 4300 (dispersant, EFKA additives). The dispersed charged particles have a diameter of 495 nm as measured by dynamic light scattering by means of a Malvern Zetasizer Nanoseries. The surface modified dispersed charged pigment particles has a zeta potential ($\zeta$) of $-47.2$ mV as measured by means of a Malvern Zetasizer Nanoseries and an electrophoretic mobility $\mu$ of $-0.01 \cdot 10^{-8}$ m$^2$/Vs, as calculated from the Smoluchowsky relation ($\zeta$=$\mu\eta$/$\in$, where $\mu$ is the mobility, $\eta$=0.844 cP is the viscosity of the medium and $\in$=2.6 is the dielectric constant).

EXAMPLE 19

A red electrophoretic dispersion is prepared by ultrasonically dispersing for 1½ h in a Bandelin® Sonorex® Super RH 102H™ sonicator, at 25° C., 0.15 g of red charged particles according to example 1 into 10 ml of Isopar® G (Exxon Mobil, d=0.748 g/cm$^3$) in the presence of 0.0449 g of the liquid block copolymer according to example 16c. The dispersed charged particles have a diameter of 40-60 nm as measured by dynamic light scattering by means of a Malvern Zetasizer Nanoseries. The surface modified dispersed charged pigment particles have a zeta potential ($\zeta$) of $-36.0$ mV as measured by means of a Malvern Zetasizer Nanoseries and an electrophoretic mobility $\mu$ of $-1.2 \cdot 10^{-8}$ m$^2$/Vs, as calculated from the Smoluchowsky relation ($\zeta$=$\mu\eta$/$\in$, where $\mu$ is the mobility, $\eta$=1.46 cP is the viscosity of the medium and $\in$=2.0 is the dielectric constant).

EXAMPLE 20

A blue electrophoretic dispersion is prepared by ultrasonically dispersing for 1 h in a Bandelin® Sonorex® Super RH 102 H™ sonicator, at 25° C., 0.2 g of blue charged particles according to example 6 into 10 ml of tetrachloro-ethylene (Riedel de Häen, d=1.622 g/cm$^3$) in the presence of 0.045 g of EFKA® 4300 (dispersant, EFKA additives). The dispersed charged particles have a diameter of 210 nm as measured by dynamic light scattering by means of a Malvern Zetasizer Nanoseries. The surface modified dispersed charged pigment particles have a zeta potential ($\zeta$) of $-40.00$ mV as measured by means of a Malvern Zetasizer Nanoseries and an electrophoretic mobility $\mu$ of $-0.15 \cdot 10^{-8}$ m$^2$/Vs, as calculated from the Smoluchowsky relation ($\zeta$=$\mu\eta$/$\in$, where $\mu$ is the mobility, $\eta$=1.844 cP is the viscosity of the medium and $\in$=2.6 is the dielectric constant).

EXAMPLE 21

A blue electrophoretic dispersion is prepared by ultrasonically dispersing for 1$^1$/$_{26}$ h in a Bandelin® Sonorex® Super RH 102 H™ sonicator, at 25° C., 0.145 g of blue charged particles according to example 6 into 10 ml of Isopar® G (Exxon Mobil, d=0.748 g/cm$^3$) in the presence of 0.05 g of the liquid block copolymer according to example 16c. The dispersed charged particles have a diameter of 40-60 nm as measured by dynamic light scattering by means of a Malvern Zetasizer Nanoseries. The surface modified dispersed charged pigment particles have a zeta potential ($\zeta$) of $-28.2$ mV as measured by means of a Malvern Zetasizer Nanoseries and an electrophoretic mobility $\mu$ of $-0.60 \cdot 10^{-8}$ m$^2$/Vs, as calculated from the Smoluchowsky relation ($\zeta$=$\mu\eta$/$\in$, where $\mu$ is the mobility, $\eta$=1.46 cP is the viscosity of the medium and $\in$=2.0 is the dielectric constant).

EXAMPLE 22

A green electrophoretic dispersion is prepared by ultrasonically dispersing for 1 h min in a Bandelin® Sonorex® Super RH 102 H™ sonicator, at 25° C., 0.15 g of green charged particles according to example 8 into 10 ml of Isopar® G (Exxon Mobil, d=0.748 g/cm$^3$) in the presence of 0.040 g of the liquid block copolymer according to example 16c. The dispersed charged particles have a diameter of 250 nm as measured by dynamic light scattering by means of a Malvern Zetasizer Nanoseries. The surface modified dispersed charged pigment particles have a zeta potential ($\zeta$) of $-38.5$ mV as measured by means of a Malvern Zetasizer Nanoseries and an electrophoretic mobility $\mu$ of $-0.07 \cdot 10^{-8}$ m$^2$/Vs, as calculated from the Smoluchowsky relation ($\zeta$=$\mu\eta$/$\in$, where $\mu$ is the mobility, $\eta$=1.46 cP is the viscosity of the medium and $\in$=2.0 is the dielectric constant).

EXAMPLE 23

A green electrophoretic dispersion is prepared by ultrasonically dispersing for 1 h in a Bandelin® Sonorex® Super RH 102 H™ sonicator, at 25° C., 0.15 g of green charged particles according to example 8 into 10 ml of tetrachloro-ethylene (Riedel de Häen, d=1.622 g/cm$^3$) in the presence of 0.045 g of EFKA® 4300 (dispersant, EFKA additives). The dispersed charged particles have a diameter of 250 nm as measured by dynamic light scattering by means of a Malvern Zetasizer Nanoseries. The surface modified dispersed charged pigment particles have a zeta potential ($\zeta$) of $-74.49$ mV as measured by means of a Malvern Zetasizer Nanoseries and an electrophoretic mobility $\mu$ of $-0.25 \cdot 10^{-8}$ m$^2$/Vs as calculated from the Smoluchowsky relation ($\zeta$=$\mu\eta$/$\in$, where µ is the mobility, η=1.844 cP is the viscosity of the medium and ∈=2.6 is the dielectric constant).

EXAMPLE 24

12 g of micronized C. I. Pigment Black 7 are dispersed for 18 hours in 400 ml of water. 0.54 g of procainamide hydrochloride are dispersed in 5 ml of water and are treated separately with 37% aqueous HCl solution. In order to form the diazo-procainoamide, a 10% molar excess of $NaNO_2$, based on the quantity of procainamide hydrochloride, is added to the procainamide hydrochloride dispersion. The diazo-procainamide compound is slowly added to the pigment suspension at 4° C. The suspension is then stirred under heating from 4° C. to 40° C. and then to 63° C. over 2 hours. Then the suspension is filtered, carefully washed with water and the product is dried at 80° C./$10^3$ Pa.

EXAMPLE 25

A black electrophoretic dispersion is prepared by ultrasonically dispersing for 1 h in a Bandelin® Sonorex® Super RH 102 H™ sonicator, at 25° C., 1 mg of black charged particles according to example 24 into 10 ml of tetrachloroethylene (Riedel de Häen, d=1.622 g/$cm^3$) in the presence of 50 mg of EFKA® 4300 (dispersant, EFKA additives).

EXAMPLE 26

55 ml of the red electrophoretic dispersion according to example 18 and 55 ml of the black electrophoretic dispersion according to example 25 are mixed by ultrasonically dispersing for 1 h at 25° C. in a Bandelin® Sonorex® Super RH 102 H™ sonicator.

EXAMPLE 27

55 ml of the blue electrophoretic dispersion according to example 20 and 55 ml of the black electrophoretic dispersion according to example 25 are mixed by ultrasonically dispersing for 1 h at 25° C. in a Bandelin® Sonorex® Super RH 102 H™ sonicator.

EXAMPLE 28

55 ml of the green electrophoretic dispersion according to example 23 and 55 ml of the black electrophoretic dispersion according to example 25 are mixed by ultrasonically dispersing for 1 h at 25° C. in a Bandelin® Sonorex® Super RH 102 H™ sonicator.

EXAMPLE 29

A yellow electrophoretic dispersion is prepared by ultrasonically dispersing, at 25° C., 5 g of yellow charged particles according to example 13 into 10 ml of dodecane (d=0.75 g/ml at 25° C., Fluka, Switzerland) in the presence of 2.5 g of a liquid block copolymer dispersant according to example 16c. The dispersed charged particles have a diameter of 260 nm as measured by dynamic light scattering by means of a Malvern Zetasizer Nanoseries. The surface modified dispersed charged pigment particles have a zeta potential (ζ) of −40 mV as measured by means of a Malvern Zetasizer Nanoseries and an electrophoretic mobility µ of $-0.043 \cdot 10^{-8}$ $m^2$/Vs, as calculated from the Smoluchowsky relation (ζ=µη/∈, where µ is the mobility, η=1.383 cP is the viscosity of the medium and ∈=2.01 is the dielectric constant).

EXAMPLE 30

A magenta electrophoretic dispersion is prepared by ultrasonically dispersing, at 25° C., 5 g of magenta charged particles according to example 11 into 10 ml of dodecane (d=0.75 g/ml at 25° C., Fluka, Switzerland) in the presence of 2.5 g of a liquid block copolymer dispersant according to example 16c. The dispersed charged particles have a diameter of 211 nm as measured by dynamic light scattering by means of a Malvern Zetasizer Nanoseries. The surface modified dispersed charged pigment particles have a zeta potential (ζ) of −35 mV as measured by means of a Malvern Zetasizer Nanoseries and an electrophoretic mobility µ of $-0.06 \cdot 10^{-8}$ $m^2$/Vs, as calculated from the Smoluchowsky relation (ζ=µη/∈, where µ is the mobility, η=1.383 cP is the viscosity of the medium and ∈=2.01 is the dielectric constant).

EXAMPLE 31

A cyan electrophoretic dispersion is prepared by ultrasonically dispersing, at 25° C., 5 g of cyan charged particles according to example 14 into 10 ml (d=0.75 g/ml at 25° C., Fluka, Switzerland) in the presence of 2.5 g of a liquid block copolymer dispersant according to example 16c. The dispersed charged particles have a diameter of 172 nm as measured by dynamic light scattering by means of a Malvern Zetasizer Nanoseries. The surface modified dispersed charged pigment particles have a zeta potential (ζ) of −45 mV as measured by means of a Malvern Zetasizer Nanoseries and an electrophoretic mobility µ of $-0.0725 \cdot 10^{-8}$ $m^2$/Vs, as calculated from the Smoluchowsky relation (ζ=µη/∈, where µ is the mobility, η=1.383 cP is the viscosity of the medium and ∈=2.01 is the dielectric constant).

EXAMPLE 32

The dispersed charged particles of a yellow electrophoretic dispersion prepared according to example 17 have a diameter of 247 nm as measured by dynamic light scattering by means of a Malvern Zetasizer Nanoseries. The surface modified dispersed charged pigment particles have a zeta potential (ζ) of −50 mV as measured by means of a Malvern Zetasizer Nanoseries and an electrophoretic mobility µ of $-0.04 \cdot 10^{-8}$ $m^2$/Vs, as calculated from the Smoluchowsky relation (ζ=µη/∈, where µ is the mobility, η=1.383 cP is the viscosity of the medium and ∈=2.01 is the dielectric constant).

EXAMPLE 33

An aqueous phase is prepared by mixing 70 g of an 10% aqueous solution of ethylene-maleic anhydride copolymer (Zeeland Chemicals), 37.5 g of 70% melamine formaldehyde resin (Beetle Resin PT336, BIP Ltd) and 270 g of deionised water. This aqueous mixture is adjusted to pH 4.0 by addition of aqueous sodium hydroxide solution. The resulting aqueous phase is then transferred to a 1 litre reactor flask equipped with a turbine blade agitator and submerged in a thermostatic water bath. The agitator speed is increased to 1000 r.p.m., then 175 g of the oil phase according to example 26 is added to the aqueous phase to form an oil-in-water emulsion with oil droplets having a mean particle size diameter of about 30 µm, as estimated by means of a light microscope. Next, the agitator speed is reduced to 450 r.p.m. and the contents of the reactor flask slowly warmed to 40° C. to allow polycondensation reaction of the melamine formaldehyde resin to form the microcapsule shell. The temperature of the encapsulating mixture is maintained at 40° C. for further 2 hours and then increased to 60° C. to complete the microcapsule shell formation. The microcapsule suspension in water is then cooled to 23° C. and the pH of mixture adjusted to 8.0 with aqueous sodium hydroxide solution. Next, the microcapsules suspension in water is filtered and washed with water to remove residual impurities. The damp microcapsule cake contains 60% solids microcap-sules having a melamine formaldehyde shell and an internal core containing the oil dispersion of the pigment particles. The capsules are dried at 30° C.

EXAMPLE 34

It is proceeded as in example 33, with the difference that the oil phase according to example 26 is replaced by the oil phase according to example 27.

EXAMPLE 35

It is proceeded as in example 33, with the difference that the oil phase according to example 26 is replaced by the oil phase according to example 28.

EXAMPLE 36

A 5% solution of a mixture of 2,6-dimethyl-4-(2' nitrophenyl)-1,4-dihydropyridine-3,5-dicarboxylic acid dimethylester (DHPM) and 2,6-dimethyl-4-(2' nitrophenyl)-1,4-dihydropyridine-3,5-dicarboxylic acid diethylesther (DHPE) in methylethylketone (MEK) is spun on a substrate at 1000 r.p.m. for 30 s. This substrate is exposed with a UV exposing machine (Karl Süss MA 6) through a mask with 1 mW/cm² for 20 s. The red/black capsules of example 33 are then deposited on the substrate by means of dipping with a tampon. The overshoot of capsules is removed by putting the glass plate on a vibrating machine (Vortex Genie 2"). After this the substrate is treated with gazeous HCl in order to stop the tackiness of the exposed areas. This process is repeated twice with the blue/black and the green/black capsules of examples 34 and 35. At the end, the substrate is exposed uniformly for about 50 s and coated with a 20% polymethyl methacrylate solution in MEK on a spin coater at 1000 r.p.m. for 30 s and dried at 100° C. on a hotplate for 2-5 minutes.

The invention claimed is:
1. An electrophoretic display, comprising electrodes and cells containing at least one kind of ionic, monochrome particles, a non-polar liquid and a dispersant, wherein the ionic, monochrome particles of at least one kind are essentially aggregates consisting of a carbon containing pigment and an anionic pigment or anionic pigment derivative, and the dispersant wherein the dispersant comprises polar as well as apolar or low polar ingredients selected from the group consisting of ingredients comprising a nitrogen atom and ingredients comprising an aromatic ring, and the apolar or low polar ingredients are selected from the group consisting of acrylic acid esters, methacrylic acid esters, allyl esters and vinyl esters, the ester group of which comprises from 1 to 24 carbon atoms, allyl and vinyl $C_1$-$C_{24}$ alkyl ethers, styrene, $C_1$-$C_{24}$ alkyl-substituted styrenes, $C_4$-$C_{12}$ lactones and hydroxy-$C_2$-$C_{24}$ acids.

2. An electrophoretic display according to claim 1, wherein the whole quantity of the pigment at least 80% of the anionic pigment or anionic pigment derivative present within the cells is comprised in the aggregates.

3. An electrophoretic display according to claim 1, wherein the ionic, monochrome particles of at least one kind are neutralized by quaternary ammonium.

4. An electrophoretic display according to claim 1, wherein the dispersant has ionic groups and the total number of ionic groups of the dispersant is equal to or lower than the total number of ionic groups of the anionic pigment or anionic pigment derivative, and the ratio of ionic groups of the anionic pigment or anionic pigment derivative to ionic groups of the dispersant is at least 1:1.

5. An electrophoretic display according to claim 1, wherein the amount of anionic pigment or anionic pigment derivative within the cells is from 0.1 to 15% by weight, calculated as protonated acid form based on the pigment.

6. An electrophoretic display according to claim 1, wherein the non-polar liquid has a dielectric constant $\in$ of from 0 to 20 and a transparency of from 90 to 100% measured in a 1 cm thick quartz cell, at one wavelength in the range of from 400 to 700 nm.

7. An electrophoretic display according to claim 1, wherein there are at least 2 kinds of monochrome particles, at least one kind of monochrome particles consisting essentially of cationic black or white particles.

8. An electrophoretic display according to claim 1, wherein from 95% to 100%, of the anionic pigment or anionic pigment derivative present within the cells is comprised in the aggregates.

9. An electrophoretic display according to claim 1, wherein the dispersant has ionic groups and the total number of ionic groups of the dispersant is equal to or lower than the total number of ionic groups of the anionic pigment or anionic pigment derivative, and the ratio of ionic groups of the anionic pigment or anionic pigment derivative to ionic groups of the dispersant is at least 5:1.

10. An electrophoretic display according to claim 1, wherein the amount of anionic pigment or anionic pigment derivative within the cells is from 1 to 12% by weight calculated as protonated acid form based on the pigment.

11. An electrophoretic display according to claim 1, wherein the amount of anionic pigment or anionic pigment derivative within the cells is from 5 to 10% by weight calculated as protonated acid form based on the pigment.

12. An electrophoretic display according to claim 1, wherein the non-polar liquid has a dielectric constant $\in$ of from 0 to 5.

13. An electrophoretic display according to claim 1, wherein the non-polar liquid has a conductivity $\kappa$ of from 0 to $10^{-2}$ S·m$^{-1}$.

14. An electrophoretic display according to claim 1, wherein the non-polar liquid has a conductivity $\kappa$ of from $10^{-16}$ to $10^{-8}$ S·m$^{-1}$.

* * * * *